United States Patent [19]

Kanamori

[11] Patent Number: 5,747,574
[45] Date of Patent: May 5, 1998

[54] FLAME-RETARDED RESIN COMPOSITION AND INSULATED WIRE

[75] Inventor: Yasuo Kanamori, Shizuoka, Japan

[73] Assignee: Yazaki Corporation, Tokyo, Japan

[21] Appl. No.: 722,642

[22] Filed: Sep. 27, 1996

[30] Foreign Application Priority Data

Sep. 29, 1995 [JP] Japan .................................. 7-253225

[51] Int. Cl.$^6$ .................................................. C08K 3/22
[52] U.S. Cl. .................. 524/436; 524/437; 174/110 SR; 174/110 PM
[58] Field of Search .............................. 525/93; 524/436, 524/437; 174/110 SR, 110 PM

[56] References Cited

U.S. PATENT DOCUMENTS

| | | | |
|---|---|---|---|
| 4,946,896 | 8/1990 | Mitsuno et al. | 525/93 |
| 5,561,185 | 10/1996 | Hashimoto et al. | 524/436 |

FOREIGN PATENT DOCUMENTS

| | | |
|---|---|---|
| 63-286449 | 11/1988 | Japan . |
| 4368714 | 12/1992 | Japan . |
| 4368715 | 12/1992 | Japan . |
| 676644 | 3/1994 | Japan . |
| 676645 | 3/1994 | Japan . |

*Primary Examiner*—Veronica P. Hoke
*Attorney, Agent, or Firm*—Sughrue, Mion, Zinn, Macpeak & Seas, PLLC

[57] ABSTRACT

A flame-retarded resin composition contains three types of components: (A) a multiple copolymer of alkylacrylate or alkyl methacrylate, ethylene, and maleic anhydride; (B) thermoplastic styrene elastomer having a tensile strength of 250 kgf/cm$^2$ or greater; and (C) polyolefin resin except the component (A). The three components have a specific blending ratio, and are added and mixed with a metal hydroxide in a specific quantity to form the composition having a hardness of durometer D not less than 48 nor more than 58.

4 Claims, No Drawings

FLAME-RETARDED RESIN COMPOSITION AND INSULATED WIRE

BACKGROUND OF THE INVENTION

The present invention relates to a flame-retarded insulated wire for use in wiring in an automobile or in a house and a resin composition for forming an insulating layer of the insulated wire.

In recent years, improvements in the performance and function of the electric equipment for an automobile result in the amount of electric wires to be used being increased. As a result, there arises a problem in that the space and weight of the wire harness have been enlarged excessively. To solve the problems above, the insulating layers have been thinned and the diameters of the conductors have been reduced.

Hitherto, as the insulating layers of the foregoing type, a structure has been widely used in which the outer surface of electric copper or the like is coated with polyvinyl chloride resin. The wire having the polyvinyl chloride resin is an excellent wire having a flame-retarded characteristic and exhibiting excellent wear resistance and flexibility.

However, since the polyvinyl chloride resin generates harmful halogen gas when burnt and, therefore, contaminates the environment of the earth, an alternative material, that is, a so-called non-halogen and flame-retarded material has been groped. That is, a material formed by adding metal hydroxide or the like serving as a flame-retarded material to polyolefin has been disclosed in Japanese Patent Unexamined Publication No. Hei 4-368714, Japanese Patent Unexamined Publication No. Hei 4-368715, Japanese Patent Unexamined Publication No. Hei 6-76644 and Japanese Patent Unexamined Publication No. Hei 6-76645.

However, the above-mentioned materials cannot attain satisfactory flame-retarded characteristic if a great quantity of the metal hydroxide is not added. On the other hand, if the quantity of addition is enlarged, the wear resistance deteriorates, thus resulting in a fact to occur that the insulating layer cannot easily be thinned. As a result, there arises a problem in that the weight of the electric wire cannot easily be reduced and the flexibility is lost.

The insulated wire coated with the above-mentioned material has been critically difficult in applying to the automobile industrial field which requires flexibility which enables a multiplicity of electric wires to be bundled to form a wire harness which is finely wired into a variety of sections in a small space, wear resistance capable of withstanding against friction with various units and between wires, and weight reduction in order to save energy.

SUMMARY OF THE INVENTION

An object of the present invention is to provide a flame-retarded and non-halogen insulated wire capable of solving the foregoing problems, exhibiting excellent wear resistance and flexibility and permitting the weight to be reduced so as to be used as electric wires for use in the automobile industrial field which requires severe conditions, as well as electric wire for use in general homes and so forth.

A flame-retarded resin composition according to the present invention has a structure comprising three types of components: (A) a multiple copolymer of alkylacrylate or alkyl methacrylate and ethylene and maleic anhydride; (B) thermoplastic styrene elastomer having a tensile strength of 250 kgf/cm$^2$ or greater; and (C) polyolefin resin except the component (A), wherein not less than 40 parts by weight nor more than 80 parts by weight of the component (A), not less than 5 parts by weight nor more than 30 parts by weight of the component (B) and a balance which is the component (C) are added to make 100 parts by weight, not less than 60 parts by weight nor more than 120 parts by weight of metal hydroxide is added to 100 parts by weight of the components (A), (B) and (C) so that the composition is obtained, and the composition has a hardness of durometer D not less than 48 nor more than 58.

An insulated wire according to the present invention has a structure comprising a conductor surround by a flame-retarded resin composition containing elements: (A) a multiple copolymer of alkylacrylate or alkyl methacrylate and ethylene and maleic anhydride; (B) thermoplastic styrene elastomer having a tensile strength of 250 kgf/cm$^2$ or greater; and (C) polyolefin resin except the component (A), wherein not less than 40 parts by weight nor more than 80 parts by weight of the component (A), not less than 5 parts by weight nor more than 30 parts by weight of the component (B), and a balance which is the component (C) are added to make 100 parts by weight, not less than 60 parts by weight nor more than 120 parts by weight of metal hydroxide is added to 100 parts by weight of the components (A), (B) and (C) so that the composition is obtained, and the composition has a hardness of durometer D not less than 48 nor more than 58.

DETAILED DESCRIPTION OF THE INVENTION

Note that the component (A) in the claims is the multiple copolymer of alkylacrylate or alkyl methacrylate and ethylene and maleic anhydride.

As the component (A), it is preferable that the copolymer is obtained by causing 1 to 14 wt % of one or more types of acrylic esters or one or more types of methacrylic acid esters, 0.3 to 4 wt % of maleic anhydride and a balance, which is ethylene (82 to 98.7 wt %) to react with one another. As a manufacturing method, although a graft copolymerizing method may be employed, the graft copolymerizing method cannot easily raise the amount of existence of the maleic anhydride in general. Thus, it cannot easily improve the wear resistance. Therefore, it is preferable that a direct copolymerization method be employed because the effect of improving the wear resistance can easily be obtained. The multiple copolymer obtained from the direct copolymerizing method can be available from Sumitomo Atchem or the like.

Note that the graft polymerizing method is a method in which ethylene and alkyl acrylate or alkyl methacrylate are directly polymerized and then a peroxide or the like is used to graft and polymerize the maleic anhydride. The direct polymerizing method is a method in which a raw material is simultaneously introduced into the system so as to be polymerized.

If the melt flow rate of the multiple polymer is 0.2 to 20 g/10 minutes, a preferably excellent extruding processability can be obtained.

As alkyl acrylate or alkyl methacrylate, methylacrylate, methylmethacrylate, ethylacrylate, ethylmethacrylate, butylacrylate and butylmethacrylate can preferably be employed because they have excellent affinity with the metal hydroxide.

Note that it is preferable that the acrylic acid ester or the methacrylic acid ester be not less than 1% nor more than 14% of the weight of the multiple copolymer. If the quantity is less than 1 wt %, the affinity with the metal hydroxide deteriorates, thus resulting in the flame-retarded characteristic and flexibility being degraded. If the quantity is larger than 14 wt %, the wear resistance deteriorates.

It is preferable that the maleic anhydride be not less than 0.3% nor more than 4% of the weight of the multiple copolymer. If the quantity is less than 0.3 wt %, satisfactory wear resistance cannot easily be obtained. A multiple copolymer containing 4 wt % or more maleic anhydride, which cannot easily be prepared in general, suffers from deterioration in the extruding processability.

The thermoplastic styrene elastomer, which is the component B, consists of a polymer block 1 composed of two or more aromatic hydrocarbons each having a vinyl group and a block copolymer having a polymer block 2 having a conjugated diene.

The aromatic hydrocarbon having the vinyl group forming the polymer block 1 is exemplified by styrene, o-methylstyrene, p-tert-butylstyrene and 1,3-dimethylstyrene. In view of easy obtaining, it is preferable that styrene be employed.

The polymer block 2 is diolefin having a pair of conjugated double bonds and exemplified by 1,3-butadiene, isoprene, 2,3-dimethyl-1,3-butadiene, 1,3-pentadiene and 1,3-hexadiene. Among the materials above, it is preferable that 1,3-butadiene or isoprene be employed because they can easily be obtained.

Note that it is preferable that the thermoplastic styrene elastomer be a material prepared by adding hydrogen and the double bonds of carbon are saturated because great tensile strength can be obtained and heat resistance can be improved.

The tensile strength of the component (B) must be 250 kgf/cm$^2$ or greater to obtain sufficient wear resistance. If the tensile strength is greater than 300 kgf/cm$^2$, significantly preferable wear resistance can be obtained. In view of obtaining such excellent tensile strength, it is preferable that triblock copolymer be employed as the thermoplastic styrene elastomer according to the present invention.

As the polyolefin resin, which is the component (C), polyethylene or polypropylene may be employed. As the polyethylene, a low density or high density polyethylene composed of only ethylene may be employed. Moreover, straight chain low density polyethylene obtainable from copolymerization with α-olefin may be employed.

Furthermore, homopolymer composed of polypropylene, random copolymer and block copolymer each of which can be obtained by copolymerization with ethylene may be employed.

Also ethylene copolymer may preferably be employed. In this case, the ethylene copolymer means a material except the multiple copolymer employed as the component (A).

It is preferable that the component (C) be a polyethylene or ethylene copolymer because of satisfactory solubility to both the multiple copolymer and the thermoplastic elastomer and excellent balance among the wear resistance, the flexibility and the flame-retarded characteristic.

The components (A), the component (B) and the component (C) form the resin composition for forming the composition for coating the coated wire according to the present invention. The component (A) must be not less than 40 parts by weight nor more than 80 parts by weight with respect to 100 parts by weight of the resin composition. If the quantity is less than 40 parts by weight, the required flame-retarded characteristic and wear resistance cannot be satisfied. If the quantity is larger than 80 parts by weight, the extruding processability at the time of manufacturing the electric wire deteriorates. As a result, the flexibility of the surface of the electric wire is lost, the wear resistance deteriorates and the tensile elongation of the coating material is excessively degraded.

To obtain sufficient flame-retarded characteristic and wear resistance, it is preferable that the quantity is not less than 50 parts by weight nor more than 60 parts by weight.

On the other hand, the component (B) must be not less than 5 parts by weight nor more than 30 parts by weight. If the quantity is less than 5 parts by weight, sufficient flexibility cannot easily be obtained. If the quantity is larger than 30 parts by weight, the wear resistance deteriorates critically. To obtain optimum wear resistance, it is preferable that the quantity be 25 parts by weight or less.

The metal hydroxide to be added as a component for imparting the flame-retarded characteristic may be hydroxide of metal, in particular, hydroxide of metal in group II or group XIII in the periodic table conforming to IUPAC nomenclature revised in 1989. For example, magnesium hydroxide, aluminum hydroxide, and calcium hydroxide may be employed.

Note that it is preferable that magnesium hydroxide be employed because the flame-retarded characteristic can be realized even if the quantity is small and influence on the wear resistance can be almost eliminated. It is preferable that the particle size of the metal hydroxide be 0.1 to 5 µm for easy handling and preventing influence on the flame-retarded characteristic of the insulated wire, which is the final product.

In view of realizing affinity with the resin and obtaining waterproof characteristic, it is preferable to use a material obtained by subjecting the foregoing particles to surface treatment with fatty acid, silane coupling agent, titanate coupling agent or an epoxy compound.

The metal hydroxide above must be added by a quantity not less than 60 parts by weight nor more than 120 parts by weight with respect to 100 parts by weight of the resin composition consisting of the component (A), the component (B) and the component (C). If the quantity is smaller than 60 parts by weight, the flame-retarded characteristic is insufficient. If the quantity is larger than 120 parts by weight, the wear resistance and the flexibility are insufficient. To obtain an optimum result, it is preferable that the quantity be not less than 70 parts by weight nor more than 110 parts by weight.

The metal hydroxide having the foregoing shape and quantity is added to the resin composition consisting of the component (A), the component (B) and the component (C). At this time, as a mixing means, a known apparatus such as a roll mill, a Banbury mixer, a kneader or a double spindle extruder may be employed.

The hardness of durometer D of the resin composition after the kneading process has been completed must be not less than 48 nor more than 58. If the hardness is less than 48, the wear resistance is unsatisfactory. If the hardness is larger than 58, the flexibility deteriorates excessively.

Note that a known antioxidation agent, a copper-poison preventive agent, a flame retardant assistant, a processing aiding material, a colorant and the like may be added in addition to the foregoing components in order to improve various performance factors.

The thus-obtained resin composition for coating is used to coat the surface of a conductor made of electric copper or the like, and molded by extruding so that an insulated wire is formed. If the thickness of the coating layer is 0.4 mm or smaller, significantly excellent flexibility can be obtained while sufficient wear resistance is being maintained.

The thus-obtained insulated wire may be cross-linked by a known method, for example, electron beams, in order to improve various performance, such as heat resistance, wear resistance and oil resistance. [Examples]

Initially, a method of manufacturing samples for use in examples of the present invention and comparative examples and various measuring methods will now be described. The tensile strength below was measured by a method conforming to JIS.K6301, while the melt flow rate indicated by symbol MI was measured by a method conforming to JIS.K7210.

Initially, various raw materials were prepared.

That is, as the component (A), two types of multiple copolymers were prepared each of which consisted of alkylacrylate, ethylene and maleic anhydride. Component (A)-(1): a copolymer (BONDINE FX-8000 obtained from Sumitomo Atchem and manufactured by Elf Atchem, France) consisting of 3 wt % of ethylacrylate, 2 wt % of maleic anhydride and 95 wt % of ethylene and prepared by the direct copolymerizing method.

Component (A)-(2): a copolymer (LOTADER2200 obtained from Sumitomo Atchem and manufactured by Elf Atchem, France) consisting of 6 wt % of butyl acrylate, 3 wt % of maleic anhydride and 91 wt % of ethylene and prepared by the direct copolymerizing method.

As the component (B), styrene-isoprene-styrene triblock copolymer having hydrogen added thereto (tensile strength: 340 kgf/cm$^2$)(SEPTON 4033 manufactured by Kuraray) was prepared.

As the component (C), three types of polyolefin resins were prepared.

component (C)-(1): linear low density polyethylene (density: 0.925 g/cm$^3$, MI: 2.3 g/10 minutes) (ULTZEX 2520F manufactured by Mitui Sekiyu Kagaku);

Component (C)-(2): high density polyethylene (density: 0.949 g/cm$^3$, MI: 0.3 g/10 minutes) (SHOWREX 5003BH manufactured by Showa Denko;

Component (C)-(3): ethylene-ethylacrylate copolymer (ethylacrylate: 15 wt %, MI: 0.75 g/10 minutes)(Rexron EEAA1150 manufactured by Nihon Sekiyu Kagaku).

To prepare materials for comparative examples, component (B)': styrene-isoprene-styrene triblock copolymer having hydrogen added thereto was prepared which was made of the same raw materials as those of the component (B) and had a smaller tensile strength (tensile strength: 240 kg/cm$^2$) (SEPTON 2055 manufactured by Kuraray).

On the other hand, as the magnesium hydroxide, magnesium hydroxide (Kisuma 5B manufactured by Kyowa Kagaku) was prepared which had been subjected to surface treatment with 2 wt % of oleic acid and which had a particle size of not less than 0.6 µm nor more than 1 µm and BET specific surface area of 5 m$^2$/g measured with the quantity of adsorption at the boiling point of nitrogen.

The above-mentioned materials were, together with the antioxidation agent, a copper-poison preventive agent and lubricant, uniformly mixed at the ratios shown in Table 1 by using a twin-roll unit so that coating compositions were prepared. The coating compositions were formed into sheet shapes by compression molding and the hardness of each composition was measured by durometer D, which was a hardness meter, by a method conforming to JIS.K7215 (results are shown in Table 1).

On the other hand, each of the above-mentioned coating compositions was formed into a pellet shape by using a granulator, and then used to coat soft copper twisted wires (the diameter of the wire: 0.19 mm, the number of wires: 19) by using an extruder to make the outer diameter of the electric wire to be 1.6 mm so that samples for the comparative examples and examples of the present invention were manufactured.

Then, the wear resistance, the flame-retarded characteristic and the flexibility were evaluated.

That is, as for the wear resistance, a method conforming to clause 5.11(2) of JASO.D611-94 was employed in which a load of 7N and a piano wire having a diameter of 0.45 mm were used and the number of reciprocating movements, as a result of which the piano wire was brought into contact with the conductor due to the wear of the insulating member, was measured. Samples withstood 300 times or more were evaluated to be acceptances.

As for the flame-retarded characteristic, a method conforming to clause 5.9 of JASO.D611-94 was employed to measure the same. Flame-out samples within 30 seconds were evaluated to be acceptances.

On the other hand, the flexibility was evaluated as follows: the wire was bent to make an angle of 180°, and then again extended to detect whether a white portion was formed in the bent portion. Samples free from a white portion was evaluated as acceptances.

Results of the foregoing evaluation methods are shown in Table 1.

TABLE 1

|  | Examples | | | | |
| --- | --- | --- | --- | --- | --- |
|  | 1 | 2 | 3 | 4 | 5 |
| Composition |  |  |  |  |  |
| Component (A)-(1) | 60 | 60 | 60 |  |  |
| Component (A)-(2) |  |  |  | 50 | 50 |
| Component (B) | 10 | 10 | 20 | 10 | 15 |
| Component (B)' |  |  |  |  |  |
| Component (C)-(1) | 20 |  |  | 40 |  |
| Component (C)-(2) | 10 | 20 | 20 |  | 35 |
| Component (C)-(3) |  | 10 |  |  |  |
| Magnesium Hydroxide | 80 | 90 | 100 | 100 | 110 |
| Antioxidation Agent | 1 | 1 | 1 | 1 | 1 |
| Copper-Poison Preventive Agent | 0.5 | 0.5 | 0.5 | 0.5 | 0.5 |
| Lubricant | 1 | 1 | 1 | 1 | 1 |

TABLE 1-continued

| | | | | | |
|---|---|---|---|---|---|
| Hardness Evaluation | 49 | 51 | 53 | 54 | 57 |
| Wear Resistance | Good | Good | Good | Good | Good |
| Flame-retarded characteristic | Good | Good | Good | Good | Good |
| Flexibility | Good | Good | Good | Good | Good |

| | Comparative Examples | | | | | | | | |
|---|---|---|---|---|---|---|---|---|---|
| | 1 | 2 | 3 | 4 | 5 | 6 | 7 | 8 | 9 |
| Composition | | | | | | | | | |
| Component (A)-(1) | 40 | 50 | 45 | 50 | 45 | | 30 | | |
| Component (A)-(2) | | | | | | 45 | | | |
| Component (B) | | | 5 | 15 | 15 | 35 | 5 | | |
| Component (B)' | | 20 | | | | | | | |
| Component (C)-(1) | 30 | | | | 10 | | 65 | | |
| Component (C)-(2) | | 30 | 50 | 35 | | 20 | | | 100 |
| Component (C)-(3) | 30 | | | | 30 | | | 100 | |
| Magnesium Hydroxide | 90 | 80 | 110 | 50 | 130 | 100 | 60 | 90 | 80 |
| Antioxidation Agent | 1 | 1 | 1 | 1 | 1 | 1 | 1 | 1 | 1 |
| Copper-Poison Preventive Agent | 0.5 | 0.5 | 0.5 | 0.5 | 0.5 | 0.5 | 0.5 | 0.5 | 0.5 |
| Lubricant | 1 | 1 | 1 | 1 | 1 | 1 | 1 | 1 | 1 |
| Hardness Evaluation | 47 | 49 | 60 | 46 | 57 | 51 | 47 | 46 | 67 |
| Wear Resistance | NG | NG | Good | NG | NG | NG | NG | NG | NG |
| Flame-retarded characteristic | Good | Good | Good | NG | Good | Good | NG | Good | NG |
| Flexibility | NG | Good | NG | Good | NG | Good | Good | NG | NG |

Component (A)-(1): copolymer composed of 3 wt % of ethylacrylate, 2 wt % of maleic anhydride and 95 wt % of ethylene
Component (A)-(2): copolymer composed of 6 wt % of butylacrylate, 3 wt % of maleic anhydride and 91 wt % of ethylene
Component (B): Hydrogen-added Styrene-isoprene-styrene triblock copolymer (tensile strength: 340 kgf/cm$^2$)
Component (B)': Hydrogen-added Styrene-isoprene-styrene triblock copolymer (tensile strength: 240 kgf/cm$^2$)
Component (C)-(1): straight chain low density polyethylene (density: 0.925 g/cm$^3$, MI: 2.3 g/10 minutes)
Component (C)-(2): high density polyethylene (density: 0.949 g/cm$^3$, MI: 0.3 g/10 minutes)
Component (C)-(3): ethylene-ethylacrylate copolymer (15 wt % of ethylacrylate, MI: 0.75 g/10 minutes)
Antioxidation Agent: tetrakis-[methylene-3-(3',5'-di-tert-butyl-4'-hydroxyphenylpropionate] methane
Copper-Poison Preventive Agent: 3-(N-salicyloyl) amino-1,2,4-triazole
Lubricant: ethylenebis.oleylamide 34

As can be understood from Table 1, the insulated wires according to Examples 1 to 5 of the present invention are excellent electric wires having satisfactory wear resistance, flame-retarded characteristic and flexibility. On the other hand, it is clearly shown that the insulated wires according to Comparative Examples are unsatisfactory in at least one of the three performance factors.

The resin composition forming the coating composition in the insulated wire according to the present invention is a composition composed of the following three components:

(A) a multiple copolymer of alkylacrylate or alkyl methacrylate and ethylene and maleic anhydride;

(B) thermoplastic styrene elastomer having a tensile strength of 250 kgf/cm$^2$ or greater; and (C) polyolefin resin, wherein the components are blended at specific ratios. Therefore, the required content of the metal oxide can be reduced while the flame-retarded characteristic is being maintained as compared with the coating material for the conventional insulated wire. As a result, the wear resistance and the flexibility can be improved.

Moreover, the range for the hardness of durometer D of the coating composition after the magnesium hydroxide has been mixed is specified so that the balance between the wear resistance and the flexibility of the coated wire, which is the product, can be maintained.

Therefore, the insulated wire coated with the flame-retarded resin composition according to the present invention is an excellent electric wire capable of satisfying all of the wear resistance, the flame-retarded characteristic and the flexibility. Since the insulated wire has the above-mentioned characteristics, the insulating layer can be thinned and, therefore, the weight can be reduced. As a result, the insulated wire can preferably be employed in the wiring for automobiles which require severe conditions, as well as in the wiring for use in the home.

What is claimed is:

1. A flame-retarded resin composition comprising:

component (A) comprising a multiple copolymer of alkyl acrylate or alkyl methacrylate, ethylene, and maleic anhydride;

component (B) comprising a thermoplastic styrene elastomer having a tensile strength of 250 kgf/cm$^2$ or greater; and component (C) comprising a polyolefin resin selected from the group consisting essentially of a homopolymer of polyethyelene, a copolymer of ethylene and an α-olefin, a copolymer of ethylene and an alkyl acrylate and a copolymer of ethylene and an alkyl methacrylate, wherein not less than 40 parts by weight nor more than 80 parts by weight of said component (A), not less than 5 parts by weight nor more than 30 parts by weight of said component (B) and a balance which is said component (C) are present to make 100 parts by weight, not less than 60 parts by weight nor more than 120 parts by weight of a metal hydroxide to 100 parts by weight of said components (A), (B) and (C) is present so that said composition is obtained, and said composition has a hardness of durometer D not less than 48 nor more than 58.

2. A flame-retarded resin composition according to claim 1, wherein said component (C) is a homopolymer of ethylene, a copolymer of ethylene and an α-olefin, or a copolymer of ethylene and an alkyl acrylate or an alkyl methacrylate.

3. A flame-retarded resin composition according to claim 1, wherein said metal hydroxide is magnesium hydroxide.

4. An insulated wire comprising a conductor and a flame-retarded resin composition surrounding said conductor, said flame-retarded resin composition containing:

component (A) comprising a multiple copolymer of alkyl acrylate or alkyl methacrylate, ethylene, and maleic anhydride;

component (B) comprising a thermoplastic styrene elastomer comprising (i) a polymer block 1 composed of two or more aromatic hydrocarbons each having a vinyl group and (ii) a polymer block 2 of a conjugated diene having a tensile strength of 250 kgf/cm$^2$ or greater; and component (C) comprising a polyolefin resin selected from the group consisting of a homopolymer of ethylene, a copolymer of ethylene and an α-olefin, a copolymer of ethylene and an alkyl acrylate and a copolymer of ethylene and an alkyl methacrylate wherein not less than 40 parts by weight nor more than 80 parts by weight of said component (A), not less than 5 parts by weight nor more than 30 parts by weight of said component (B) and a balance which is said component (C) are present to make 100 parts by weight, not less than 60 parts by weight nor more than 120 parts by weight of a metal hydroxide to 100 parts by weight of said components (A), (B) and (C) are present so that said composition is obtained, and said composition has a hardness of durometer D not less than 48 nor more than 58.

* * * * *